Sept. 1, 1936.  W. H. McSWAIN  2,053,039
MOLTEN GLASS SHEARS
Filed Jan. 25, 1935
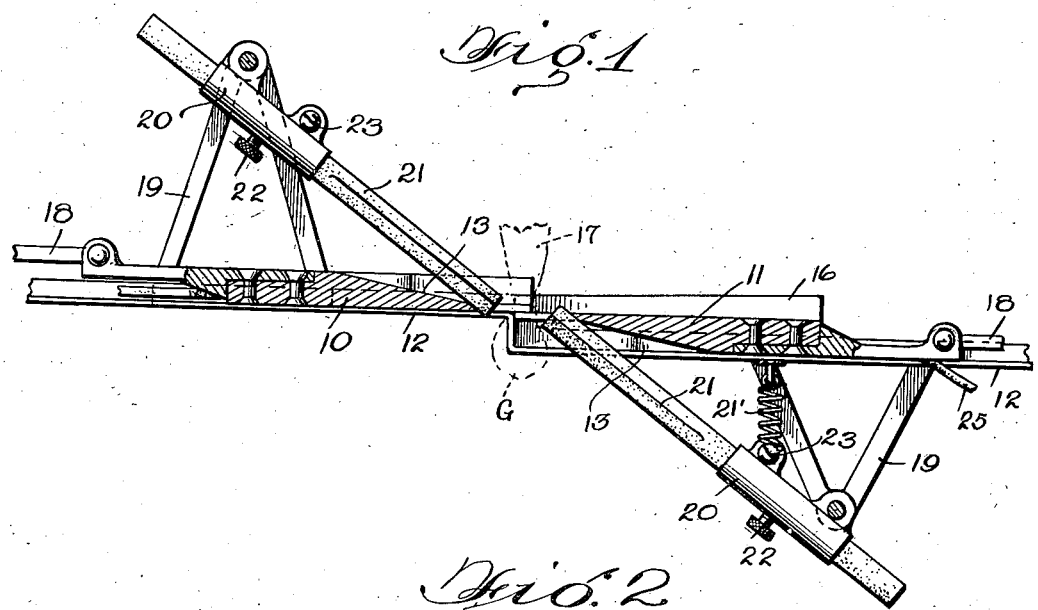
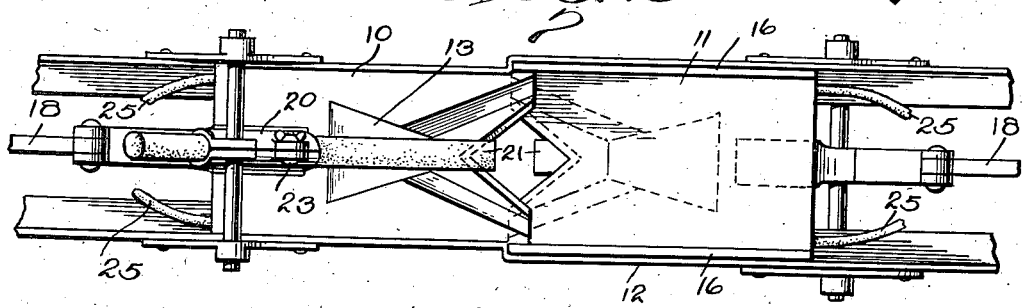
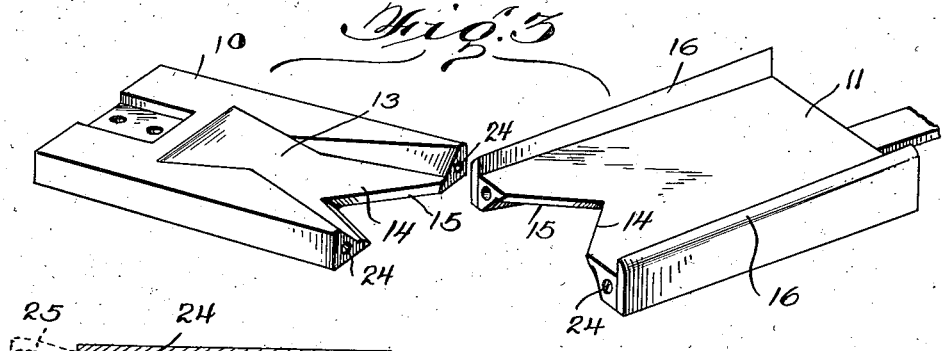
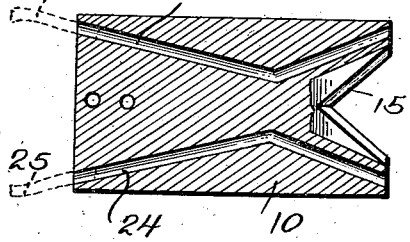
Inventor
William H. McSwain Patented Sept. 1, 1936

2,053,039

UNITED STATES PATENT OFFICE 2,053,039

MOLTEN GLASS SHEARS

William H. McSwain, Baltimore, Md., assignor of one-third to Moses Cohen, Baltimore, Md.

Application January 25, 1935, Serial No. 3,513

15 Claims. (Cl. 49—14)

This invention relates to glass machinery and has special reference to machinery for forming molded and blower glassware.

In machinery of this character it is customary to supply glass in a plastic condition from a melting tank through a nozzle to a series of molds on a table. Such glass, while plastic, is of a nature which requires that it be cut off in masses proper to supply the successive molds as these molds are positioned under the nozzle by the movement of the table. To perform this cutting off operation there is, under modern practice, provided a pair of shear blades which are so arranged as to cut across the stream of glass flowing from the nozzle at predetermined time intervals so that each cut off mass drops into the mold positioned to receive it. All this is in accordance with present practice in this art.

Such shear blades have to work through highly heated plastic glass so that, even when alloy steel of the type not readily dulling under heat conditions is employed, the edges of such blades tend to become dulled by continuous use. Consequently, it is necessary, from time to time, in present practice, to remove and resharpen such blades.

One important object of the present invention is to provide a novel and efficient means whereby such blades will be constantly subjected to sharpening during their operation.

Furthermore, it has been found that if such blades be subjected to a constant cooling operation during use the extent of sharpening required will be greatly lessened so that the life of the blades will be greatly prolonged whether constantly or intermittently sharpened.

Attempts have been made to keep such blades cool by subjecting them to blasts of cold air or jets of cold water but such attempts necessarily result in chilling the outflowing glass and consequent injury to the product.

A second important object of the present invention is to provide an improved form of blade and cooling means wherein such cooling means will not affect the glass stream in such manner as to cool or chill the same.

With the above and other objects in view, the invention consists in general of certain novel details of construction and combinations of parts hereinafter fully described, illustrated in the accompanying drawing and specifically claimed.

In the accompanying drawing like characters of reference indicate like parts in the several views, and:

Figure 1 is a vertical section on the longitudinal median line of a pair of shears constructed in accordance with this invention.

Figure 2 is a plan view of such a pair of shears.

Figure 3 is a perspective view of a pair of shear blades suitable for use in connection with this invention.

Figure 4 is a section through one of the pair of shear blades and showing the air passages therein.

It is to be understood that while the pair of shear blades here shown are blades reciprocating in the same straight line other blades, such as those oscillating about a center can well be used. The invention is not therefore to be understood as confined to linearly reciprocating blades but wherever the term "cooperating shear blades" is used it is to be understood that such blades are to include any cooperating blades whether reciprocating or oscillating.

In the present embodiment there is shown a pair of blades 10 and 11 which are mounted to slide on angle guides 12. The respective upper and lower faces of these blades are channeled on their remote faces as at 13 with channels which taper down to their proximal edges, said edges being provided with V-shaped confronting notches 14 provided with sharpened edges 15. One of these blades has side flanges 16 to hold and guide the other blade in proper alignment with the remaining blade in its reciprocal movement. These blades are positioned just below the nozzle 17 common to glass blowing and molding machines so that the mass G of glass may drop between the space between the two V-shaped edges when these are apart and be cut off when the two blades move together and overlap. No means has here been shown for reciprocating these blades at proper intervals because such means do not, at present, constitute any part of this invention but it is to be understood that a suitable means, associated with the mold table, will be provided to effect timed operation of the blades. Nevertheless, means, such as the links 18, are provided for connecting the blades to the operating means.

Attached to the supports 12 are brackets 19 whereto are pivoted sleeves 20. In these sleeves are mounted carborundum sharpening rods 21 which rest in the notches 14, being held therein by a tension spring 21' for the under rod and by the weight of the upper rod. Set screws 22 or clamps 23 serve to hold the rods in position in the sleeves so that, as the rods wear, they may be adjusted to constantly engage and sharpen the edges 15 as the cutter blades reciprocate.

Obviously, oscillating blades may be similarly provided.

In order to keep the blades cool there is provided in each blade a pair of channels 24 which are so positioned as to extend as close as possible, under constructional conditions, to the cutting edges 15. These channels are provided with cold air through supply pipes 25 supplied from some suitable source. This constant supply of cold air keeps the edges of the blades cool and prevents rapid wear while the constant action of the rods 21 keeps the blade edges sharp.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a machine of the class described, a pair of coacting cutter blades having cutting edges, means to move said blades to and fro over predetermined paths to open and close on the material to be cut, and abrasive sharpening elements mounted to engage the cutting edges and sharpen the same as the blades are moved.

2. In a machine of the class described, a pair of coacting cutter blades having V-shaped notches forming cutting edges, means to move said blades to and fro over predetermined paths to open and close on material to be cut, and sharpening rods in constant engagement with the apices of said notches.

3. In a machine of the class described, a pair of coacting cutter blades having V-shaped notches forming cutting edges, means to move said blades to and fro over predetermined paths to open and close on material to be cut, sharpening rods in constant engagement with the apices of said notches, sleeves pivotally and slidably supporting said rods at points spaced from said edges, and means to secure said rods in slidably adjusted positions in said sleeves.

4. In a machine of the class described, a pair of coacting movable cutting blades having cutting edges, cooling fluid conduits extending through said blades adjacent said cutting edges, means to supply said conduits with cooling fluid, and means to constantly exert sharpening action on said blades during their coacting movement.

5. In a machine of the class described, a pair of coacting movable cutting blades having cutting edges, cooling fluid conduits extending through said blades adjacent said cutting edges and parallel thereto, means to supply said conduits with cooling fluid, and means to constantly exert sharpening action on said blades during their coacting movement.

6. In a machine of the character described, coacting movable cutter blades having cutting edges and cooling fluid chambers adjacent said edges, and sharpening elements mounted to engage said edges and sharpen said edges as the blades are moved to and fro to open and close on the material to be cut.

7. In a machine of the character described, a pair of coacting cutter blades having oppositely disposed notches forming cutting edges, means for moving said blades to and fro to open and close on the material to be cut, means carried by one of said blades engaging and guiding the other blade in a predetermined path, and sharpening elements mounted to engage said cutting edges and sharpen the same as the blades are moved.

8. In a machine of the character described, a pair of coacting cutter blades having cutting edges, means to move said blades to and fro over predetermined paths to open and close on the material to be cut, sharpening elements pivotally mounted to engage said cutting edges and project into the path of movement thereof and adapted to be moved out of said path by the movement of said cutting edges in engagement therewith to sharpen said edges as the blades are moved.

9. In a machine of the character described, a pair of coacting cutter blades having cutting edges, each blade having a groove in its face adjacent its cutting edge, means to move said blades to and fro to open and close on the material to be cut, and abrasive sharpening elements mounted adjacent said cutting edges, each element lying in the groove of its associated blade and engaging the cutting edge thereof when said blades are open and riding over said edge as the blades are moved to closed position.

10. In a machine of the character described, a pair of horizontally disposed coacting cutter blades having cutting edges, means to move said blades to and fro to open and close on the material to be cut, upper and lower sharpening elements pivotally mounted to engage said cutting edges and sharpen said edges as the blades are moved, said upper element resting upon its associated cutting edge and riding thereupon as the blade is moved, and means for resiliently holding said lower element against its associated cutting edge.

11. In a machine of the character described, a pair of coacting cutter blades having cutting edges, means to move said blades to and fro to open and close on the material to be cut, supports adjacent said blades, sharpening elements mounted on said supports to engage said cutting edges and sharpen said edges as the blades are moved to and fro, said elements being adjustable on said supports relative to said cutting edges.

12. In a machine of the character described, coacting cutter blades having opposed notched cutting edges, means to move said blades to and fro, one over the other, to open and close on the material to be cut, said blades having grooves in their outer faces adjacent said notched cutting edges, sharpening elements mounted adjacent said blades and extending into said grooves and between the opposed edges of said blades in engagement with said notched edges when said blades are in open position and riding over said edges to sharpen said cutting edges as the blades are moved to closed or open position.

13. In a machine of the character described, coacting cutter blades having cutting edges, and adapted to be moved to and fro to open and close on the material to be cut, means engaging said cutting edges to sharpen said edges as the blades are moved, and means for cooling said edges as the blades are moved and sharpened.

14. In a machine of the class described, a pair of movable coacting cutter blades having oppositely disposed notches forming cutting edges, sharpening means engaging said cutting edges as the blades are moved, and means within said blades affording cooling means for said edges.

15. In a machine of the class described, a pair of coacting movable cutting blades having oppositely disposed notches forming cutting edges, cooling fluid conduits extending through said blades adjacent said cutting edges and substantially parallel thereto, sharpening means engaging said cutting edges as the blades are moved, and means to supply said conduits with cooling fluid.

WILLIAM H. McSWAIN.